Figure 1:
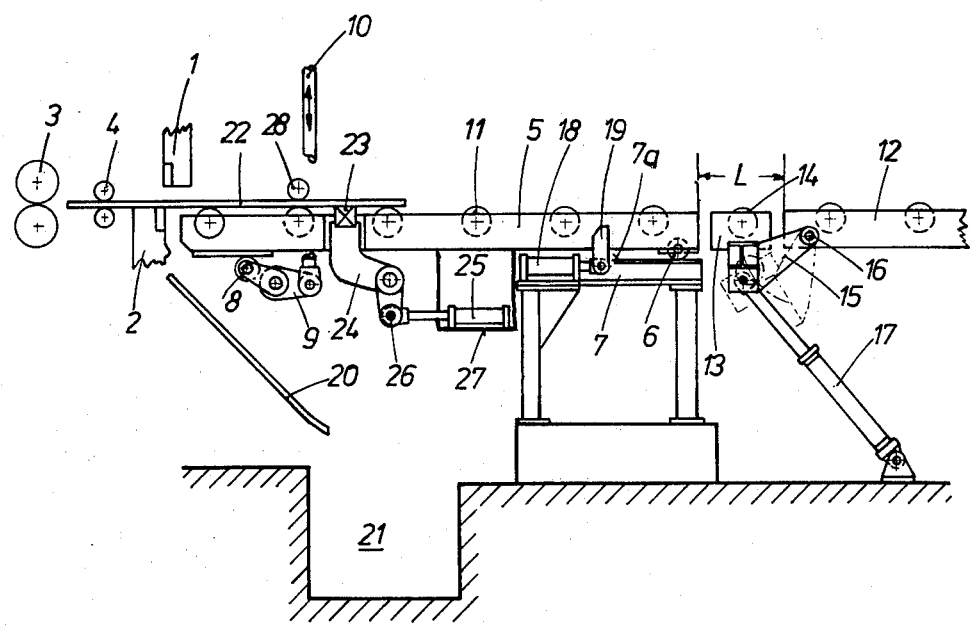

United States Patent [19]
Biernot

[11] B 3,916,742
[45] Nov. 4, 1975

[54] SHEET CUTTING

[76] Inventor: Oskar Karl Biernot, Ensheimer Str. 34, 667 St. Ingbert, Saar, Germany

[22] Filed: Dec. 17, 1973

[21] Appl. No.: 425,539

[44] Published under the Trial Voluntary Protest Program on January 28, 1975 as document no. B 425,539.

[52] U.S. Cl. .......................... 83/27; 83/74; 83/104; 83/157; 83/251; 83/276; 83/364
[51] Int. Cl.² .......................................... B26D 7/16
[58] Field of Search .......... 83/27, 74, 75, 104, 251, 83/276, 364, 157

[56] References Cited
UNITED STATES PATENTS
3,600,992    8/1971    Dryon .............................. 83/251 X Primary Examiner—J. M. Meister
Attorney, Agent, or Firm—John J. Dennemeyer

[57] ABSTRACT

A method of and apparatus for cutting a sheet into sections of predetermined length. The cutting means is a cross cutting shears disposed upstream of a tilting table which is longitudinally displaceable. In a first feed step, a sheet to be cut is fed between the shears so that a sheet length preferably slightly less than the predetermined length extends upstream of the shears. This actual length of sheet is then compared with the predetermined length and in the event of an error signal the sheet is clamped on to the tilting table and the latter displaced longitudinally away from the shears until the actual sheet length coincides with the predetermined sheet length whereupon the shears are operated.

5 Claims, 2 Drawing Figures

SHEET CUTTING

The invention relates to a method and apparatus for the measured feed of a partial length of sheet through cross cutting shears, the shears being followed by a tilting table which is longitudinally displaceable for clearing the space behind the shears and is provided with driven roller bed rollers.

Therefore, the tilting table located after cross cutting shears for a sheet must be longitudinally displaceable in order to clear the way for the remaining pieces of a divided sheet, which is pushed by an end-discharge device through the shears aperture, to fall onto the waste conveyor. In order to facilitate the longitudinal displacement of the tilting table, one or two roller bed rollers located after the tilting table are moved out of alignment with the roller bed rollers by lowering of tilting (DT-PS 975 357).

The invention deals with the following problems:

In the case of long, heavy sheets, it is difficult to move the sheets forward with a low tolerance by a certain partial length of the sheet, by drive rollers or roller bed rollers arranged in front of the cross cutting shears. Owing to the high inertia of a heavy sheet, it is necessary to change the drive rollers over to a low speed shortly before the approach of the desired partial length of the sheet and to travel the last centimetres at a crawling speed. Apart from the electrical expenditure, it is an essential drawback of this method that valuable time is lost due to moving the desired partial length of sheet at a crawling speed.

A further difficulty arises if sheets to be divided have to be controlled to achieve the desired partial length by measured forwards movement, i.e. with the assistance of a measuring roller or the like as a device for measuring the length. Shorter remaining ends of the sheet may have already left the drive rollers before the desired length has passed through the aperture of the shears. However, the desired length may only be regulated accurately by clamping a heavy sheet by pairs of drive rollers. The arrangement of a further pair of drive rollers behind the cross cutting shears does not lead to a solution of this problem, because on account of the necessary tilting table, a pair of driving rollers of this type could only be located after the tilting table. Due to this, the additional pair of driving rollers is much too far from the shears. After the withdrawal of the end of the sheet from the pair of drive rollers located at the inlet side, it is therefore prohibited to allow the sheet to move forwards due to the driven rollers of the tilting table, because the sheet is supported only loosely on the roller bed rollers and even at the time of a momentary stoppage of the roller bed rollers, could slide on further due to its inertia, due to which the desired length passing through could not be established accurately.

It is the object of the invention to rid the drive rollers located in front of the cross cutting shears of the task of undertaking the last feed interval at very slow speed. To solve this problem, it is proposed according to the invention that the feed of the sheet brought about by drive rollers or roller bed rollers is stopped shortly before reaching the desired partial length and by clamping the sheet to the tilting table is completed by its measured longitudinal displacement with stationary roller bed rollers until there is a comparison of the desired value and the actual value. Thus, according to the invention, with continuous measurement of the length of sheet passing through the aperture of the shears, a last feed interval, which must lie inside the longitudinal displacement of the tilting table provided, is brought about by this longitudinal displacement of the tilting table.

If the remaining end of a sheet which has already left the drive rollers is to be divided, before the last feed interval is carried out with the assistance of the longitudinal displacement of the tilting table, the driven roller bed rollers of the tilting table come into action.

An apparatus for carrying out this method comprises at least one controllable device located on the tilting table for the temporary clamping of the sheet on the tilting table, controllability of the roller bed rollers of the tilting table appropriately by means of d.c. drive motors and a construction of the displacement drive for the tilting table, with which, for selectively clearing the space behind the shears, a quick-action adjustment encompassing the entire displacement or a delayed longitudinal displacement to be stopped in a controlled manner within the maximum displacement, is provided.

Since the end of the sheet may have left the measuring roller provided as authorised and located in front of the cross cutting shears, due to its distance from the cutting plane of the shears, before the desired length of the forwards movement of the sheet is achieved, a second measuring roller is appropriately provided after the shears, which is designed to receive the measured value of the length of sheet passing through in the same feed step, supplied by the measuring roller located in front of the shears. In this way, feed lengths may be introduced accurately, in which the end of the sheet stops between the measuring roller at the inlet side and the cutting point.

The controllable apparatus for clamping the sheet on the tilting table consists according to a further proposal of the invention of at least one holding magnet which may be applied against the undersibe of the sheet. In order to allow both a quick-action adjustment for clearing the space behind the shears in normal operation as well as an intended longitudinal displacement within the maximum displacement of the tilting table, and since a hydraulic displacement drive is provided for the tilting table, with which is associated a hydraulic control circuit for the reverse actuation of the displacement drive over the entire displacement, the supply or discharge of pressure medium may be automatically closed off at random or in the case of a zero comparison between the desired and actual feed length.

The invention will now be described by way of example only with reference to the accompanying drawings, in which:

FIG: 1 is a diagrammatic side view of one embodiment of the invention, and

FIG: 2 is a circuit diagram of an electro-hydraulic control system for the apparatus of the invention.

Referring to FIG: 1, the cross cutting shears are indicated by the sections of a movable upper blade support 1 and a stationary lower blade support 2. Located in front of the cross cutting shears are two pairs of drive rollers 3, the spacing of which may be adjusted to the respective width of the sheet. Located between the cross cutting shears and the pairs of drive rollers is a measuring roller 4 for monitoring the length of sheet which has passed through.

Located behind the cross cutting shears is a tilting table 5, which is supported so that it may tilt at the rear end by means of small rollers 6 which rest on tracks 7a of a support rail 7. At the front end, adjacent the shears, the tilting table 5 is supported by rollers 8, which are supported by double-armed rocking levers 9 mounted in a fixed manner. Tie-rods 10 engage the rocking levers 9, which tie-rods move up and down in synchronism with the upper blade bar 1 of the cross cutting shears so that at the time of the cut, the tilting table 5 moves downwards about the centres of the rollers 6.

Figure 2:
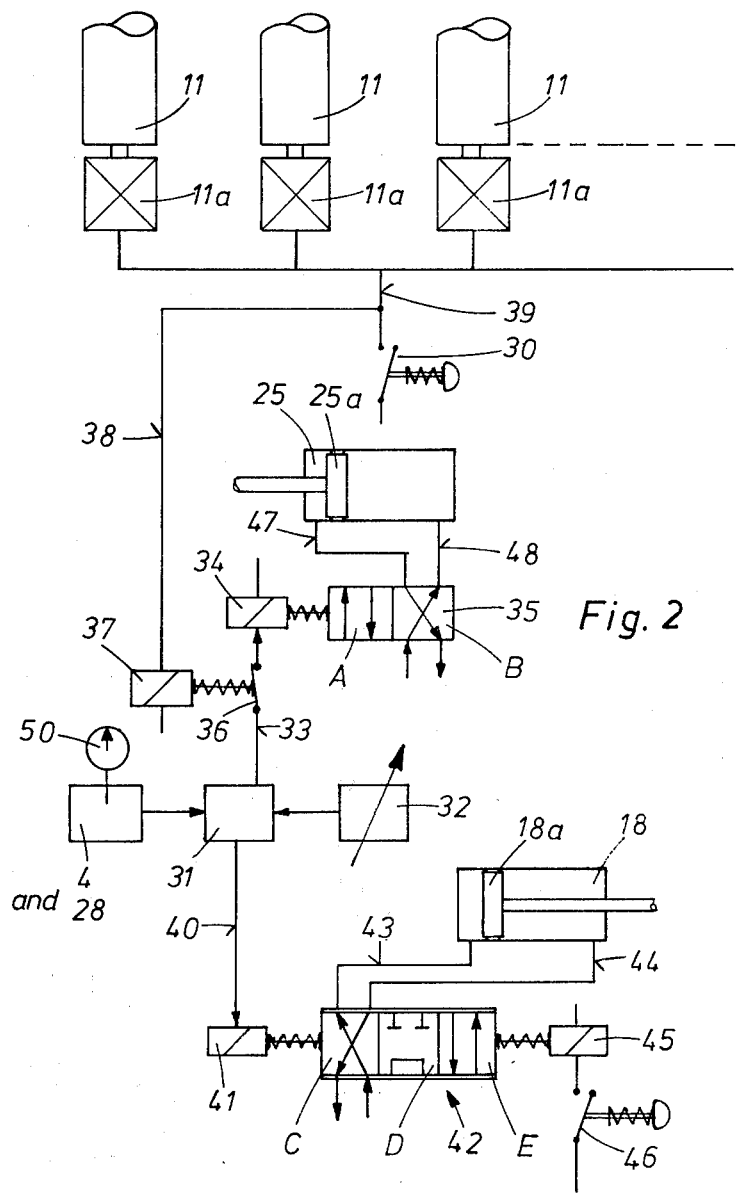

The tilting table 5 continues as a stationary roller bed after an interval L. Located inside the gap L is a roller bed section 13 with a roller bed roller 14 which, in the drawing, is located at the same level as the pre-arranged roller bed rollers 11 driven by motors 11a (FIG. 2). The roller bed section 13 is supported by rocking levers 15 which may be tilted downwards about an axis of rotation 16 by means of a hydraulic adjusting motor 17 into the position shown in dot-dash line, so that the gap L is free. This gap is therefore provided in order to be able to move the tilting table 5 so far towards the right that a space is cleared in the vicinity of the shears, through which a waste end of a divided sheet may drop on the chute 20, which guides the waste end to a waste conveyor which is not shown located in the foundation channel 21.

A hydraulic adjusting motor 18 serves for the longitudinal displacement of the tilting table 5, which motor is attached to the support rail 7 and whose piston rod is connected to the tilting table 5 by a strap 19. The stroke of the adjusting motor 18 corresponds approximately to the extent of the gap L. The control of the adjusting motor 18 is normally designed for a reversible quick-action adjustment of the tilting table 5 from abutment to abutment.

A controllable apparatus supported by the tilting table 5 for arresting a sheet 22 on the stationary roller bed rollers 11 of the tilting table 5 consists in the embodiment of two holding magnets 23 supported by angle levers 24. By means of a hydraulic adjusting motor 25, the piston rod of which engages the angle levers 24 by means of a pivot 26, the holding magnets 23 may be moved from a lowered position to against the lower side of the sheet 22 in order to pull the sheet tight against the stationary roller bed rollers 11 of the tilting table 5. The adjusting motor 25 rests on a supporting structure 27 connected to the tilting table.

In addition, a second measuring roller 28 is provided above the second roller bed roller 11 of the tilting table 5. This second measuring roller 28 is arranged to receive the measured value of the length of sheet which has passed through in the same feed step supplied by the measuring roller 4 located in front of the shears and is actually only necessary if it should happen that in the case of a pre-set actual value of a partial length of sheet, the end of the sheet has left the vicinity of the measuring roller 4 at the inlet side: In this case, it is necessary for the measuring function of the measuring roller 4 to be taken over by the additional measuring roller 28.

The control circuit illustrated in FIG. 2 includes a spring-loaded switch 30 which is closed manually to energize the motors 11a of the roller bed rollers 30 of the tilting table 5. The measuring rollers 4 and 28 are connected on the one hand to a visual display device 50 and on the other hand to one input of a comparator 31. Another input of the comparator 31 is connected to an adjustable reference value source which supplies a signal corresponding to the predetermined length of sheet to be cut. One output of the comparator 31 is connected by a conductor 33 to a solenoid 34 for switching a valve 35 for controlling the hydraulic adjusting motor 25 for raising and lowering the holding magnets 23.

The conductor 33 incorporates a switch 36 spring loaded into the closed position and operated, for opening, by a solenoid 37 connected to a conductor 38 in parallel with a conductor 39 supplying power to the motors 11a. Thus, when the switch 30 is open the switch 36 will be closed but when the switch 30 is closed the solenoid 37 is energized and the switch 36 opened to prevent raising of the holding magnets 23.

Another output of the comparator 31 is connected by a conductor 40 to a control solenoid of a three-position valve 42 for controlling the hydraulic adjusting motor 18. The valve 42 has a central position in which the fluid pressure lines 43, 44 thereto are blocked. A switch 46 in combination with a solenoid 45 serves for moving the valve 42 into a position in which the adjusting motor 18 returns the tilting table 5 into the starting position.

The method of operation of the apparatus illustrated for the measured advance of a partial length of the remaining sheet through cross cutting shears is as follows:

It is assumed that the sheet 22 has to be moved so far forwards until the end of the sheet has left the measuring roller 4 provided at the inlet side. For this, the second measuring roller 28 is lowered onto the sheet. After leaving the drive rollers 3 at the inlet side, the sheet 22 is forthwith solely moved on by the driven roller bed rollers 11 which are brought into operation by operating the switch 30 whereupon the switch 36 opens and the control valve is set in position A in which the line 47 is connected to the fluid supply and the line 48 is connected to the return thereby moving the holding magnets 23 into the lowered position.

The two measuring rollers 4 and 28 are connected to each other such that the measuring roller 28 continues the measurement of length even when the end of the sheet has left the measuring roller 4. There is thus always a signal of the entire length of sheet moved forwards since the last cross cut and this length is indicated on the display device 50. When the display device 50 shows that a difference exists between the preset desired value and the measured actual value, which difference is smaller than the gap L between the tilting table 5 and the stationary roller bed 12, then the roller bed rollers 11 of the tilting table 5 are stopped by opening the switch 30, in which case it is immaterial whether or not the sheet 22 moves on somewhat further due to its inertia, since the measuring roller 28 registers such a movement as a feed of the sheet. When the roller bed rollers 11 are switched off, the solenoid 37 is de-energized and the switch 36 closes under its spring pressure. Since a continuous comparison at the comparator 31 inevitably produces an error signal and since the switch 36 is closed, the solenoid 34 is energized and switches the control valve 35 into the position B as illustrated in FIG. 2. Thus, the piston 25a of the hydraulic adjusting motor 25 is moved to the left as shown in FIG. 2, such that the two holding magnets 23 are swung up against the underside of the sheet 22, as shown in FIG. 1. At the same time, the roller bed section 13 with the roller 14 is moved downwards by actuating the adjusting motor 17 so that the gap L is free. By means of a feedback circuit (not shown) the error signal from the comparator 31 is transmitted along the conductor 40 only when the plate 22 has been clamped on the tilting table 5 by the holding magnets 23. This error signal energizes the solenoid 41 to switch the valve 42 from the blocking central position into the position C as shown in FIG. 2. The piston 18a of the adjusting motor 18 is thus loaded by the line 43 so that the table 5 together with the plate 22 clamped thereon are moved in the feed direction. This can be regarded as the second feed step during which the actual length of the sheet 22 that has passed through the shears 1, 2 continues to be measured by the measuring rollers 4 or 28 so that the actual or measured value of this length approaches the predetermined length. When the actual length coincides with the predetermined length no error signal is transmitted along the line 40 and the valve 42 is returned into the central blocking position D. Accordingly, the piston 18a and hence the tilting table 5 and the plate 22 clamped thereon are arrested whereupon the shears 1, 2 are operated to cut off the plate section of predetermined length. The switch 30 is then closed so that the rollers 11 are again rotated to carry the plate section away, the holding magnets 23 being moved downwards at the same time. The switch 46 is also closed to energize the solenoid 45 which switches the valve 42 into position E so that the piston 18A of the adjusting motor 18 is loaded by the line 44 and moves the tilting table 5 into the starting position shown in FIG. 1. Immediately prior to the return of the table 5 into the starting position, the end discharge device may be actuated in order to allow a waste section to drop onto the chute 20. After return of the table 5 into the starting position, the roller bed section 13 with the roller 14 is moved upwards into alignment with the tilting table 5 and the stationary roller bed 12.

The preceding description of the method of operation of the feed device according to the invention is based on the remaining end of a sheet still to be divided. It will be understood that the preceding cuts of the cross cutting shears are also carried out with the longitudinal displacement of the tilting table, in which case, before the last feed interval, not the roller bed rollers 11 of the tilting table, but the drive rollers 3 provide the main feed and only the measuring roller 4 measures the feed. The drive rollers 3 are opened in the last feed interval and are then inoperative.

What is claimed is:

1. A method of cutting a sheet into sections of predetermined length, comprising advancing the sheet longitudinally between cross cutting shears until and actual length of sheet not greater than said predetermined length is located downstream of said shears and rests on a longitudinally displaceable tilting table, automatically comparing said predetermined and actual lengths to produce an error signal in the event of the actual length being less than the predetermined length, and, on occurrence of an error signal, clamping the sheet on the tilting table and displacing the tilting table longitudinally away from the cross cutting shears until the actual length coincides with the predetermined length whereupon the shears are operated to cut the section of predetermined length from the sheet.

2. Apparatus for cutting a sheet into sections of predetermined length, comprising a pair of cross cutting shears, a longitudinally displaceable tilting table downstream of said shears, a bed of driven rollers on said table, drive means for advancing said sheet between said shears and onto said table in a first feed step, means for measuring the actual length of sheet extending downstream of the shears after said first feed step, comparison means for comparing the measured actual length with said predetermined length, clamping means for clamping the sheet onto said table in the event of an error signal from said comparison means, and drive means for displacing the table longitudinally so as to perform a second feed step of the sheet after which said actual length coincides with the predetermined length.

3. Apparatus as claimed in claim 2, wherein first actual length measuring means are provided upstream of the shears and second actual length measuring means are provided downstream of the shears for completing the measurement of said actual length in the event of the sheet leaving the vicinity of said first measuring means before the end of said first feed step.

4. Apparatus as claimed in claim 2, wherein the clamping means comprises a magnet mounted for application the lower surface of the sheet on the tilting table.

5. Apparatus according to claim 2 with a hydraulic displacement drive for the tilting table with which is associated a hydraulic control circuit for the reversible actuation of the displacement drive over the entire displacement, and the supply or discharge of pressure medium being automatically closed off when a zero comparison between the desired and actual feed length is achieved.

* * * * *